United States Patent Office 3,527,990
Patented Sept. 8, 1970

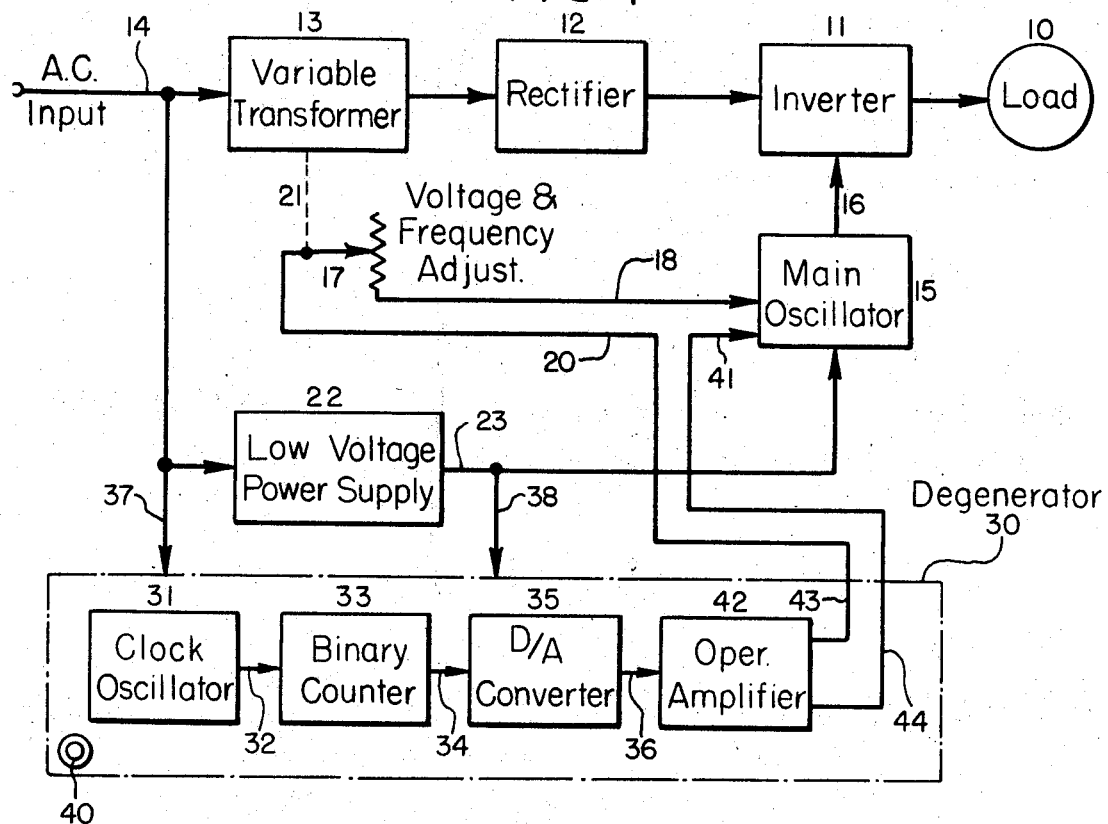
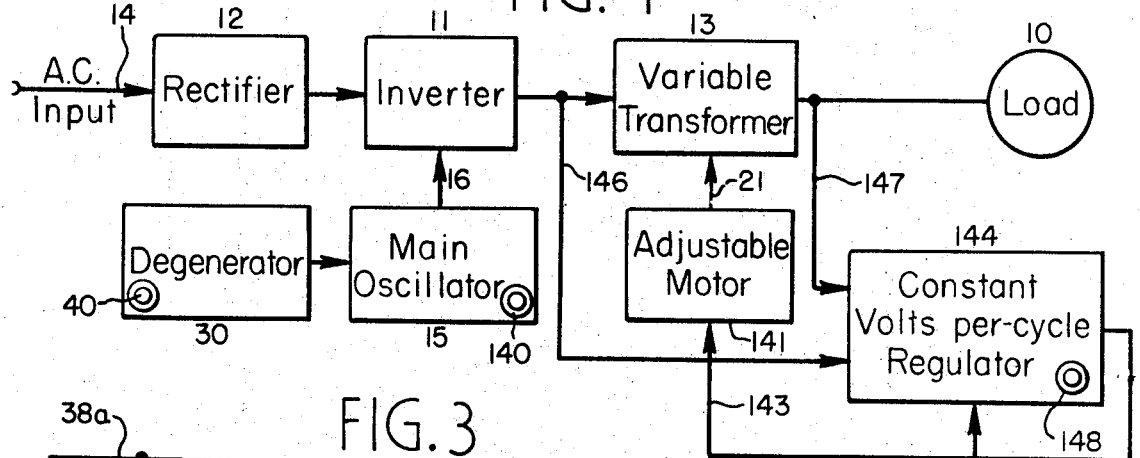
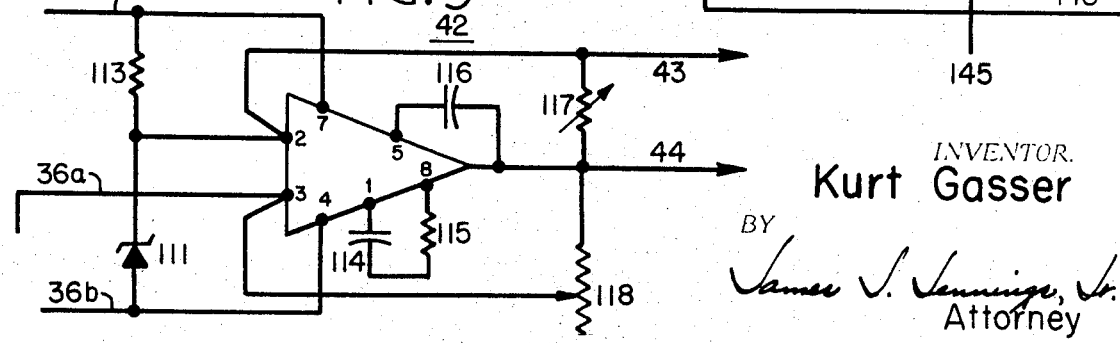

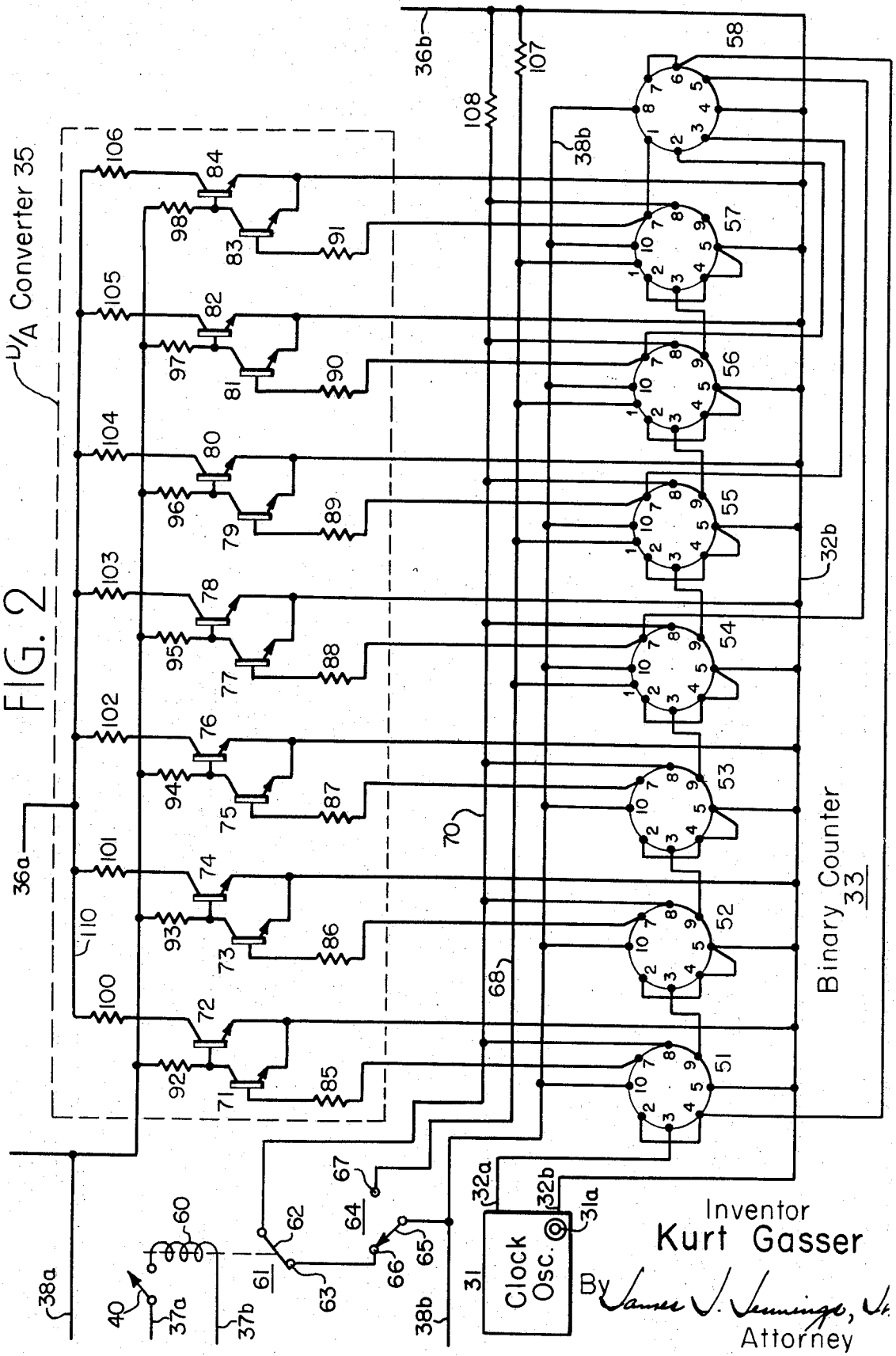

3,527,990
MOTOR SPEED CONTROL SYSTEM WITH
INCREMENTAL SPEED VARIATION
Kurt Gasser, Orange, Calif., assignor to Borg-Warner
Corporation, Chicago, Ill., a corporation of Delaware
Filed Dec. 22, 1967, Ser. No. 692,823
Int. Cl. H02p 7/62
U.S. Cl. 318—6                                    15 Claims

ABSTRACT OF THE DISCLOSURE

An inverter 11 is supplied from a rectifier 12 coupled to an A-C supply line, and the frequency of the inverter output voltage is regulated by a main oscillator 15 to control the speed of the motor energized by the inverter. A degenerator circuit 30 is coupled to the main oscillator to provide a predetermined incremental variation in the frequency of the main oscillator output signal and correspondingly effect a programmed change in the motor speed. The degenerator includes a clock oscillator 31, a binary counter 33 coupled to the clock oscillator, and a digital-to-analogue converter 35.

BACKGROUND OF THE INVENTION

In the motor control art it is now recognized that the speed of an A-C motor can be regulated by energizing the motor from an inverter which in turn has its frequency controlled by a main oscillator. A teaching of such a system is set out in U.S. Pats. 3,178,624, which issued Apr. 13, 1965, and 3,351,835, which issued Nov. 7, 1967. It is thus known that the motor speed can be varied over a significant range by changing the frequency of the main oscillator output signal, effecting a corresponding change in frequency of the inverter output voltage and a consequent change in the motor speed.

For some manufacturing processes it is desirable to effect an incremental or vernier type variation of the motor speed after the system has reached its normal operating velocity. For example if synthetic fibers are being formed by combining a plurality of filaments and winding the fibers on a drum, the collection of the fibers or stands on the drum is termed "build-up" of the "package." As the fiber is produced and collected the mass of the package increases and correspondingly enlarges the effective diameter of the drum. If the drum speed were maintained constant the gradually increasing mass of the package would produce an increased linear velocity of the fiber being wound on the drum, but the high degree of control requisite in this field of production requires that the fiber speed be maintained substantially constant. This requirement can be met if the drum speed can be gradually diminished at a substantially linear rate over the time interval in which the package build up occurs. Although the actual increase of the effective package diameter is not a linear function, it has been found that a linear speed change does compensate for the changing diameter of the package. It is therefore toward the production of an accurate, economical and easily controlled incremental speed variation system to solve the just described problem and other similar difficulties that the present invention is primarily directed.

SUMMARY OF THE INVENTION

A system for regulating the speed of an electrical motor may include an inverter for providing an output A-C voltage to energize the motor, the motor speed being a function of the frequecy of the A-C voltage. A rectifier is connected to receive A-C energy and supply D-C energy to the inverter, and a main oscillator is coupled to the inverter to regulate the frequency of the inverter output voltage as a function of the frequency of the control signal supplied by the main oscillator to the inverter. An inverter driver or logic circuit may be coupled between the main oscillator and the inverter, but the frequency of the inverter output voltage is still a function of the frequency of the control signal supplied by the main oscillator.

In accordance with the present invention a degenerator circuit is provided to pass a gradually varying modulating signal to the main oscillator to effect the requisite incremental change in motor speed. The degenerator circuit includes an auxiliary or clock oscillator for providing timing signals at a predetermined frequency, and a binary counter is coupled to the auxiliary oscillator to provide successive switching signals as the timing signals are received from the auxiliary oscillator. A digital-to-analogue converter is coupled between the binary counter and the main oscillator to convert the switching signals into a gradually varying modulating signal for changing the frequency of the main oscillator output control signal in the appropriate manner to produce the desired incremental variation of the motor speed.

While not requisite to the degenertor arrangement, an operational amplifier or some other unit may be coupled between the digital-to-analogue converter and the main oscillator to provide desired gain and/or impedance matching characteristics which enhance the performance of the overall system.

THE DRAWINGS

The features of the present invention which are believed to be novel are set forth with particularilty in the appended claims. The organization and manner of operation of the invention may best be understood by reference to the following description taken in connection with the accompanying drawings, in the several figures of which like reference numerals identify like elements, and in which:

FIG. 1 is a block diagram illustrating a known motor control system, and the provision and incorporation of a novel degenerator circuit in such a system;

FIG. 2 is a schematic diagram illustrating details of the major portion of the degenerator circuit shown generally in FIG. 1;

FIG. 3 is a schematic diagram showing details of the remainder of the degenerator circuit shown generally in FIG. 1; and FIG. 4 is a block diagram depicting another motor control system in which the degenerator circuit of this invention finds utility.

GENERAL SYSTEM DESCRIPTION

As shown generally in FIG. 1, an A-C motor or load 10 is connected such that its speed is regulated in accordance with the frequency of the output A-C voltage from an inverter 11. The inverter receives D-C energy from a rectifier 12, and if desired a filter (not shown) may be supplied between the rectifier and inverter to minimize the variation of the D-C voltage. A variable transformer 13 is provided between A-C input line 14 and the rectifier 12, to effect a change in the amplitude of the A-C voltage supplied to the rectifier and produce a corresponding regulation of the amplitude of the A-C voltage applied to the motor. Some voltage amplitude regulating means is illustrated in FIG. 1 and also in FIG. 4 because of the common practice of energizing an induction motor with A-C energy in which the ratio of amplitude-to-frequency (generally termed "volts-per-cycle" ratio) is maintained substantially constant over the speed range. Those skilled in the art will appreciate that such amplitude regulation is not requisite in a system in which only the frequency of the motor-supplying voltage is varied and thus the present invention is not limited to a system in which the voltage amplitude is also regulated.

A main oscillator 15 is connected to supply a control signal over line 16 to the inverter, such that the frequency of this control signal regulates the frequency of the inverter A-C output voltage. As a practical matter the inverter driver or logic system may be connected in line 16 to distribute the control signal to the appropriate switching components in the inverter. Such arrangements are well known and need not be illustrated in that the frequency of the inverter output voltage remains a function of the frequency of the control signal supplied by the main oscillator. This control signal frequency is established by the setting of potentiometer 17, shown coupled between conductors 18 and 20. For purposes of this explanation potentiometer 17 can be considered as the means for establishing the frequency of the control signal provided by main oscillator 15. Through a mechanical linkage 21 the setting of variable transformer 13 is changed concomitantly with, and proportionally to, a change in the frequency of the main oscillator output control signal. A low voltage power supply 22 is connected for energization by the A-C energy received over input line 14 to supply a D-C energizing potential over line 23 to main oscillator 15, and over line 38 to the degenerator system 30 of this invention.

The degenerator circuit 30 includes a clock or auxiliary oscillator 31 connected to supply timing signals at a predetermined frequency over line 32 to a binary counter circuit 33 which produces successive switching signals as the timing signals are received from the oscillator 31. These switching signals are passed over line 34 to a digital-to-analogue converter 35 which provides a gradually varying control signal on line 36. Degenerator 30 is energized with A-C energy received over lines 14 and 37, and with D-C energy received over lines 23, 38. Operation of the degenerator circuit is initiated by actuation of a switch 40, depicted as a button or similar actuator in FIG. 1.

The gradually varying control signal on line 36 can be inserted directly between conductors 20, 41 to change the frequency of the control signal supplied by the main oscillator.

In a preferred embodiment it has been found helpful to provide an operational amplifier stage 42 coupled between converter 35 and output conductors 43, 44 which supply the gradually varying control signal to the main oscillator 15 as the switching signals are provided by the binary counter.

DETAILED DESCRIPTION OF DEGENERATOR CIRCUIT

In FIG. 2 a preferred embodiment of the degenerator circuit is illustrated. As there shown a plurality of flip-flops 51–57 are coupled together in a binary counting chain arrangement, and a gate circuit 58 is connected to the end of the counting chain to terminate operation of the degenerator when the counting circuit is "full." Clock oscillator 31, which may be a conventional crystal-controlled unit, has its output circuit connected over conductor 32a to the 3 terminal of the first flip-flop 51, and separately connected to common or reference conductor 32b. Unidirectional energy is supplied to the circuit over conductors 38a and 38b. A-C energy is received over conductors 37a, 37b and, upon closure of start switch 40, is applied to winding 60 of a relay 61 to displace movable contact 62 away from fixed contact 63. This actuation of switch 40 initiates the countdown or degenerating action in that normal-test switch 64 is illustrated in the normal or reset position with movable contact 65 engaging fixed contact 66. Upon displacement to engage fixed contact 67, the potential received over conductor 38b is applied over conductor 68 to the 1 pin of the last four flip-flops 54–57 to provide a test function. Upon return of switch 64 to the illustrated position the potential received over conductor 38b is applied over conductor 70 to the 8 pin of each flip-flop 51–57 to clear or reset the counting chain and prepare it for the next operation upon closure of switch 40 and consequent actuation of relay switch 61.

The digital-to-analogue converter 35 comprises switching transistors 71–84. A resistor 85 is coupled between the base of first transistor 71 and the 7 terminal of the first flip-flop 51, and resistors 86–91 are similarly individually coupled between the base of each of succeeding transistors 73, 75, and so forth to the 7 terminal of each of flip-flops 52–57. Another resistor 92 is coupled between energizing conductor 38a and the common connection between the collector of transistor 71 and the base of transistor 72. Each succeeding resistor 93–98 is similarly connected to a common connection associated with the successive switching stages. A first binary-weighted resistor 100 is coupled between a common output line 110 and the collector of transistor 72. The succeeding weighted resistors 101–106 are similarly each coupled between common conductor 110 and the collector of one of the other even-numbered transistors 74, 76 and so forth through transistor 84. Common conductor 110 is coupled over input conductor 36a to the operational amplifier 42 (FIG. 3). The common connection of the emitters of each pair of switching transistors such as 71, 72, is coupled to the common or ground conductor 32b in binary counter 33. Resistor 107 is coupled between this reference conductor 32b and conductor 68, and resistor 108 is coupled between conductor 70 and reference conductor 32b.

Common conductor 32b is coupled over conductor 36b to one side of a Zener diode 111 (FIG. 3) and to the 4 terminal of operational amplifier 42. The other side of Zener diode 111 is coupled both to the 2 input terminal of operational amplifier 42 and, through a resistor 113, to energizing conductor 38a. In the operational amplifier circuit a capacitor 114 and resistor 115 are coupled in series between the 1 and 8 terminals, and a capacitor 116 is coupled between the 5 terminal of this amplifier and output conductor 44. A variable resistor 117 is coupled between output conductors 43 and 44, and a potentiometer 118 is coupled between the 3 terminal of amplifier 42 and output conductor 44.

To operate the system shown in FIGS. 2 and 3 an A-C energizing potential is applied between conductors 37a and 37b, and the appropriate unidirectional potentials are applied to conductors 38a and 38b, measured with respect to the ground or reference conductor 32b. To commence the degenerating action switch 40 is closed and relay 61 operates, separating movable contact 62 from the fixed contact 63 and enabling the counting chain to start tallying the timing signals received from the clock oscillator 31 over conductors 32a, 32b. Prior to receipt of the first signal after the relay has been operated, transistor 71 is conducting or in the on condition and transistor 72 is off or non-conducting. This means terminal 7 of flip-flop 51 is "high."

Upon receipt of the first timing signal from oscillator 31, terminal 7 of the first flip-flop 51 goes low and transistor 71 is switched off, interrupting the current flow through resistor 92 and causing the potential at the bottom of resistor 92 to rapidly approach that on conductor 38a. In a preferred embodiment, this was a positive potential, thus applying a positive-going potential to the base-emitter circuit of transistor 72 and switching this transistor on. This action places resistor 100 in a circuit between conductors 110 and 32b, applying a voltage signal between input conductor 36a and 36b to operational amplifier 42.

As the next timing pulse is received from clock oscillator 31, flip-flop 52 is switched on and flip-flop 51 is switched off, placing resistor 101 in the circuit between conductors 110 and 32b and removing resistor 100 from this circuit. With the receipt of the next timing signal resistor 100 is again placed in the circuit so that the effective parallel connection of resistors 100 and 101 places a new value of resistance between conductors 36a and 36b and provides a signal of a different voltage level to the operational amplifier. This action continues in a well-known manner until the binary counter 33 is full as signalled by operation of the gate circuit 58. Those skilled in the art will appreciate that any number of counting stages can be employed, and that the total switching time and number of stages (absent other controls) determine the time interval during which the degenerator circuit operates after the closure of switch 40. Not only is the time interval determined but also the extent of the voltage gradient applied between conductors 36a and 36b is established by selection of the values of the weighted resistors 100–106, and the potential different applied between conductors 110 and 32b. Thus, any desired time interval and any level of motor speed variation, caused by the frequency changes in turn effected by the differences in total voltage gradient, can be provided by the illustrated system.

Both the amount of frequency change and the period or time required for the degeneration operation can be readily adjusted, if desired, by simple front panel controls. For example, variable resistor 117, the feedback resistor in the circuit of operational amplifier 42, can be adjusted to vary the gain of the operational amplifier circuit and thus control the amount of the total frequency change. Similarly, an adjustable frequency-control potentiometer, represented by knob 31a in FIG. 2, can be placed in the clock oscillator circuit to regulate the frequency of the timing signals from oscillator 31 and correspondingly regulate the total time to "fill" counting circuit and thus control the amount of the total frequency degenerator circuit. Those skilled in the art will appreciate the various modifications possible with the arrangement of this invention.

FIG. 4 depicts another motor control arrangement in which the variable transformer 13 is coupled between inverter 11 and the load or motor 10. Again, the inverter is energized from a rectifier 12 and the frequency of the inverter A-C output voltage is regulated by the frequency of a control signal received over line 16 from main oscillator 15. An adjusting knob 140 on the main oscillator may control an element such as potentiometer 17 shown in FIG. 1 to regulate the frequency of the oscillator output signal. Degenerator circuit 30 is connected to control the change in frequency of the output signal from the main oscillator.

An adjustable motor 141 is mechanically coupled over line 21 to regulate the voltage setting of variable transformer 13 as a function of an electrical signal received over line 143 from a constant volts-per-cycle regulator 144. Regulator 144 is energized by A-C energy received over line 145, and senses, over lines 146 and 147, the amplitude and frequency of the energy passed over the variable transformer to A–C motor 10. A reference volts-per-cycle ratio is established by adjusting means 148 in regulator 144, and the input energy is compared against this preset ratio so that upon a significant deviation from the desired volts-per-cycle ratio adjustable motor 141 is driven in the proper direction to change the setting of variable transformer 13 and conform the actual volts-per-cycle ratio of the energy passed to the motor with the preset ratio. A more extensive description of such a system is set out in U.S. Pat. 3,351,835 which issued Nov. 7, 1967 and is assigned to the assignee of this invention. Those skilled in the art will appreciate the underlying principles of the present invention are also applicable to, and useful in connection with, a motor control system in which there is no regulation of the voltage amplitude and only the motor speed is controlled by the main oscillator and by the degenerator circuit.

To assist those skilled in the art to make and use the invention with a minimum of experimentation, component identification and values for the circuit of FIGS. 2 and 3 will be set out below. Such values are not given in any sense by way of limitation or illustration of the inventive concept but only to facilitate the construction and operation of the degenerator circuit. This circuit was operated with conductor 32b as the common or ground conductor, and with voltages of +20 volts D–C applied over conductor 38a, and +3 volts D–C applied over conductor 38b.

| Components: | Identification or value(s) |
|---|---|
| 51–57 | MC826 (Motorola). |
| 58 | μL914 (Fairchild). |
| 42 | 709C (Fairchild). |
| 71–84 | 2N3646. |
| 92–98 | 1,200 ohms, 1 watt. |
| 85–91 | 1,000 ohms, ½ watt. |
| 100 | 256K ohms. |
| 101 | 128K ohms. |
| 102 | 64K ohms. |
| 103 | 32K ohms. |
| 104 | 16K ohms. |
| 105 | 8K ohms. |
| 106 | 4K ohms. |
| 107, 108 | 1,000 ohms. |
| 113 | 470 ohms, ½ watt. |
| 115 | 1.5K ohms, ½ watt. |
| 117 | 400–800 ohms, ½ watt. |
| 118 | 200–300 ohms. |
| 111 | 10 volts, 1 watt. |
| 114 | 250 picofarads. |
| 116 | 100 picofarads. |

Although only a particular embodiment of the invention has been described and illustrated, it is manifest that various modifications and alterations may be made therein. It is therefore the intention in the appended claims to cover all such modifications and alterations as may fall within the true spirit and scope of the invention.

What is claimed is:

1. A system for controlling the speed of an electrical motor in accordance with the frequency of A-C energy provided by an inverter, including means for supplying D-C energy to the inverter, and a main oscillator coupled to the inverter to regulate the frequency of the inverter output voltage as a function of the frequency of a control signal supplied by the main oscillator, including
    a degenerator circuit comprising
    an auxiliary oscillator for providing timing signals,
    a binary counter coupled to the auxiliary oscillator for providing switching signals responsive to receipt of said timing signals, and
    a digital-to-analogue converter, coupled between said binary counter and said main oscillator, for providing a gradually varying modulating signal to said main oscillator responsive to receipt of said switching signals from the binary counter to effect a predetermined, gradual change in the motor speed.

2. A motor speed regulating system as claimed in claim 1 in which the degenerator circuit includes an operational amplifier, coupled between the digital-to-analogue converter and the main oscillator, to assist in providing said gradually varying modulating signal to the main oscillator.

3. A motor speed regulating system as claimed in claim 2 including means for adjusting the total amplitude variation of said gradually varying modulating signal and correspondingly regulating the total change of motor speed.

4. A motor speed regulating system as claimed in claim 1 including means for adjusting the frequency of the timing signals provided by the clock oscillator and correspondingly regulating the total time during which the change in motor speed is effected.

5. A motor speed regulating system as claimed in claim 1 in which said degenerator circuit comprises a start switch connected to initiate operation of said binary counter upon actuation of the start switch.

6. A system for controlling the speed of an electrical motor in accordance with the frequency of A-C energy provided by an inverter, including a variable transformer connected to receive A-C energy, a rectifier coupled between the variable transformer and the inverter, a main oscillator coupled to the inverter to regulate the frequency of the inverter output voltage as a function of the frequency of a control signal supplied by the main oscillator, and a primary adjusting means, electrically coupled to the main oscillator and mechanically coupled to the variable transformer, for presetting both the frequency of said control signal and the amplitude of the voltage passed from the variable transformer to the rectifier, including a degenerator circuit comprising an auxiliary oscillator for providing timing signals, a binary counter coupled to the auxiliary oscillator for providing switching signals responsive to receipt of said timing signals, and a digital-to-analogue converter, coupled between said binary counter and said main oscillator, for providing a gradually varying modulating signal to said main oscillator responsive to receipt of said switching signals from the binary counter to effect a predetermined, gradual change in the motor speed.

7. A motor speed regulating system as claimed in claim 6 in which the degenerator circuit includes an operational amplifier, coupled between the digital-to-analogue converter and the main oscillator, to assist in providing said gradually varying modulating signal to the main oscillator.

8. A motor speed regulating system as claimed in claim 7 including means for adjusting the total amplitude variation of said gradually varying modulating signal and correspondingly regulating the total change of motor speed.

9. A motor speed regulating system as claimed in claim 6 including means for adjusting the frequency of the timing signals provided by the clock oscillator and correspondingly regulating the total time during which the change in motor speed is effected.

10. A motor speed regulating system as claimed in claim 6 in which said degenerator circuit comprises a start switch connected to initiate operation of said binary counter upon actuation of the start switch.

11. A system for controlling the speed of an electrical motor in accordance with the frequency of A-C energy provided by an inverter, including a rectifier connected to receive A-C energy and supply D-C energy to the inverter, a main oscillator coupled to the inverter to regulate the frequency of the inverter output voltage as a function of the frequency of a control signal supplied by the main oscillator, a variable transformer coupled between the inverter and the motor, an adjustable motor mechanically coupled to said variable transformer for regulating the amplitude of the A-C voltage passed to the motor in accordance with a received adjusting signal, a constant volts-per-cycle regulator connected to sense the amplitude and frequency of the A-C voltage passed over the variable transformer to the motor and to provide said adjusting signal for regulating the adjustable motor to maintain a preset volts-per-cycle ratio, and a primary adjusting means in the volts-per-cycle regulator for presetting said volts-per-cycle ratio, including a degenerator circuit comprising an auxiliary oscillator for providing timing signals, a binary counter coupled to the auxiliary oscillator for providing switching signals responsive to receipt of said timing signals, and a digital-to-analogue converter, coupled between said binary counter and said main oscillator, for providing a gradually varying modulating signal to said main oscillator responsive to receipt of said switching signals from the binary counter to effect a predetermined, gradual change in the motor speed.

12. A motor speed regulating system as claimed in claim 11 in which the degenerator circuit includes an operational amplifier, coupled between the digital-to-analogue converter and the main oscillator, to assist in providing said gradually varying modulating signal to the main oscillator.

13. A motor speed regulating system as claimed in claim 12 including means for adjusting the total amplitude variation of said gradually varying modulating signal and correspondingly regulating the total change of motor speed.

14. A motor speed regulating system as claimed in claim 11 including means for adjusting the frequency of the timing signals provided by the clock oscillator and correspondingly regulating the total time during which the change in motor speed is effected.

15. A motor speed regulating system as claimed in claim 11 in which said degenerator circuit comprises a start switch connected to initiate operation of said binary counter upon actuation of the start switch.

References Cited

UNITED STATES PATENTS

| | | | |
|---|---|---|---|
| 3,165,686 | 1/1965 | MacDonald | 318—231 |
| 3,189,804 | 6/1965 | Dolphin et al. | 318—6 |
| 3,351,835 | 11/1967 | Borden et al. | 318—227 |

ORIS L. RADER, Primary Examiner

K. L. CROSSON, Assistant Examiner

U.S. Cl. X.R.

318—227, 231